(12) United States Patent
Ho et al.

(10) Patent No.: US 10,675,558 B2
(45) Date of Patent: Jun. 9, 2020

(54) DISPERSED MOBILE-PHASE COUNTERCURRENT CHROMATOGRAPHY

(71) Applicants: Yiu Cheong Ho, Hong Kong (CN); Jeffrey Tze Fei Wong, Hong Kong (CN); Hong Xue, Hong Kong (CN)

(72) Inventors: Yiu Cheong Ho, Hong Kong (CN); Jeffrey Tze Fei Wong, Hong Kong (CN); Hong Xue, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 303 days.

(21) Appl. No.: 15/487,845

(22) Filed: Apr. 14, 2017

(65) Prior Publication Data
US 2017/0304744 A1 Oct. 26, 2017

Related U.S. Application Data

(60) Provisional application No. 62/391,090, filed on Apr. 20, 2016.

(51) Int. Cl.
*B01D 11/04* (2006.01)
*G01N 30/42* (2006.01)
(Continued)

(52) U.S. Cl.
CPC ......... *B01D 11/0438* (2013.01); *G01N 30/42* (2013.01); *G01N 30/6039* (2013.01); *G01N 2030/027* (2013.01)

(58) Field of Classification Search
None
See application file for complete search history.

(56) References Cited

U.S. PATENT DOCUMENTS 3,853,765 A 12/1974 Tanimura et al.
4,051,025 A 9/1977 Ito
(Continued)

FOREIGN PATENT DOCUMENTS

CN 204807519 U 11/2015

OTHER PUBLICATIONS

Kostanyan et al, "Controlled-cycle pulsed liquid-liquid chromatography. A modified version of Craig's counter-current distribution," Journal of Chromatography A, Jan. 4, 2011.*
(Continued)

*Primary Examiner* — Krishnan S Menon
(74) *Attorney, Agent, or Firm* — Lewis Rice LLC

(57) ABSTRACT

A dispersed mobile-phase countercurrent chromatography system is described in which solutes are carried by a stream of dispersed mobile phase solvent through a column, or array of serially-connected columns, of stationary phase solvent with which the mobile phase solvent is immiscible. Solutes carried along by the stream of dispersed mobile-phase solvent will be equilibrated between the mobile-phase solvent and the stationary-phase solvent. Because the mobile-phase is dispersed into mini-droplets much smaller in diameter than the column of stationary phase, the enhanced surface/volume ratio of the droplets expedites countercurrent equilibration of different solutes between the mobile-phase solvent and the stationary-phase solvent in accordance with the distribution-coefficients of the solutes between the two solvents. As a result, a solute with a distribution coefficient that favors its dissolving in the stationary phase will be retarded in its migration through the columns compared to a solute with a distribution coefficient that favors its dissolving in the mobile phase. The different migration rates of different solutes bring about their chromatographic separation on the columns, effectively combin-
(Continued)

ing the advantages of countercurrent distribution (e.g., elimination of any solid chromatographic matrix, and therefore losses of solutes due to adsorption to the solid matrix and contamination of separated solutes by impurities leached from the solid matrix) and liquid column chromatography (e.g., continuous mode of operation, and scalable from analytical to large industrial separations without any centrifugal or discontinuous mechanical steps).

13 Claims, 4 Drawing Sheets

(51) Int. Cl.
  *G01N 30/60* (2006.01)
  *G01N 30/02* (2006.01)

(56) References Cited

U.S. PATENT DOCUMENTS 4,430,216 A    2/1984   Ito
4,551,251 A *  11/1985  Kolobow ............... G01N 30/42
                                                210/198.2
4,968,428 A    11/1990  Nunogaki

OTHER PUBLICATIONS

Guzlek, H., et al., "Performance Comparison Using the Guess Mixture to Evaluate Counter-Current Chromatography Instruments," Journal of Chromatography A, 2009, pp. 4181-4186, vol. 1216.

Ho, T. Y.-C., et al., "Dispersed Mobile-Phase Countercurrent Chromatography," Separations, 2016, pp. 1-8, vol. 3, No. 32.

Ito, Y., et al., "High-Speed Preparative Counter-Current Chromatography with a Coil Plant Centrifuge," Journal of Chromatography, 1982, pp. 247-258, vol. 244.

Kostanyan, A. E., et al., "Controlled-Cycle Pulsed Liquid-Liquid Chromatography. A Modified Version of Craig's Counter-Current Distribution," Journal of Chromatography A, 2011, pp. 6135-6143, vol. 1218.

Murayama, W., et al., "A New Centrifugal Counter-Current Chromatograph and its Application," Journal of Chromatography, 1982, pp. 643-649, vol. 239.

Tanimura, T., et al., "Droplet Countercurrent Chromatography," Science, 1970, pp. 54-56, vol. 169.

* cited by examiner

DISPERSED MOBILE-PHASE COUNTERCURRENT CHROMATOGRAPHY

CROSS REFERENCE TO RELATED APPLICATIONS

This application claims the benefit of U.S. Provisional Patent Application Ser. No. 62/391,090 filed on Apr. 20, 2016, the disclosure of which is incorporated herein by reference in its entirety.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

REFERENCE TO A SEQUENCE LISTING, TABLE, OR COMPUTER PROGRAM LISTING APPENDIX SUBMITTED ON A COMPACT DISC AND AN INCORPORATION-BY-REFERENCE OF THE MATERIAL ON A COMPACT DISC

Not applicable.

FIELD OF THE INVENTION

The present invention generally relates to a method for the separation of solutes in a mixture of solutes. More particularly, the invention combines the advantages of countercurrent distribution and liquid column chromatography into a Dispersed Mobile-Phase Countercurrent Chromatography (DMCC) method that is readily applicable to different scales of separation ranging from analytical separations to large scale industrial separations.

BACKGROUND OF THE INVENTION

Countercurrent distribution (CCD) was invented as a purification method in the 1940's based on the partitioning of solutes between two immiscible solvents [1]. The method does not require any solid-matrix support, and therefore offers the important advantages of minimizing losses of solutes due to adsorption to solid chromatographic matrices and preventing contamination by impurities from such matrices during the process of purification. However, because it requires multiple equilibrations and transfers of upper and lower solvent phases between a large battery of tubes, the method is mechanically cumbersome to implement. Accordingly, a number of modifications of CCD have been proposed to improve the methodology.

In the countercurrent chromatographic system called droplet countercurrent chromatography (DCCC) [2, 3], a mixture of solutes can be separated in a series of columns where a mobile phase is passed through a stationary phase droplet by droplet to bring about phase equilibration and solute exchange between the two phases. Since DCCC has no need for a solid chromatographic matrix, it does not incur any loss of solutes through irreversible adsorption to solid matrices, thus allowing recovery of practically all the solutes after evaporation of the solvents. DCCC also can work under room temperature and pressure, avoiding the need for expensive high pressure systems. Whereas systems such as gas chromatography and high performance liquid chromatography would entail loss of resolution due to non-optimal flow dynamics and surface adsorptions, DCCC is free of such problems because both phases in the system are liquids. However, as described in U.S. Pat. No. 3,853,765 [3], the diameter of the columns employed in DCCC is of the order of only 1.8 mm to make possible the droplet-by-droplet flow of the mobile phase, which greatly restricts the operable volume. Therefore separation by DCCC is mainly limited to analytical applications. For this reason, in recent years, usage of DCCC has been largely displaced by centrifugal countercurrent techniques.

Centrifugal countercurrent techniques include centrifugal partition chromatography (CPC) [4, 5], high speed countercurrent chromatography (HSCCC) [6-9] and high performance countercurrent chromatography (HPCCC) [10], where separation of the two immiscible liquid phases is speeded up by centrifugal force. The main disadvantage of these techniques is that the need for centrifugation limits the scale up process, because the separation columns/tubing have to fit into a centrifuge. After each separation, the solvents have to be flooded out by pumping nitrogen into the column, and this takes time and requires pressurized nitrogen. The requirement for centrifugation also has to be met with expensive equipment.

In another modification, namely controlled-cycle pulsed liquid-liquid chromatography (CPLC), mixing of upper and lower phases is conducted in columns segmented into a cascade of chambers by horizontal perforated plates, and equilibration of solutes between the phases needs to be achieved on a discontinuous basis with pauses for phase separation in between [11]. Its discontinuous mode of operation incurs mechanical inconvenience as in the original CCD procedure, and potential loss of resolution.

BRIEF SUMMARY OF THE INVENTION

In the present invention of the 'Dispersed Mobile-Phase Countercurrent Chromatography (DMCC)' separation method, the advantages of countercurrent distribution are combined with the advantages of column chromatography. Chromatographic separation of different solutes with dissimilar distribution coefficients toward a pair of immiscible mobile phase and stationary phase is brought about by the equilibrations of the solutes between the countercurrent streams of these two phases past one another. Notably, the DMCC method is continuous in its operation, and therefore differs from the CCD and CPLC methods which require discontinuous countercurrent flow of one immiscible phase past another immiscible phase, interrupted by pauses for the performance of solute equilibrations between the two phases. DMCC also differs from the DCCC method: in DCCC, the diameter of the columns of stationary phase needs to be comparable to the diameter of droplets of mobile phase, viz. of the order of 1.8 mm, which restricts severely the total separation volume of the system; in contrast, there are no constraints on the diameter and thus the volume of the columns of stationary phase in DMCC, thereby readily allowing large industrial scale separations of solutes. As well, DMCC requires no centrifugation to speed up equilibration of the mobile and stationary phases, and therefore differs from the centrifugal CPC, HSCCC and HPCCC methods.

A method of separating a mixture of solutes using a dispersed-mobile phase countercurrent chromatography (DMCC) system is provided. The DMCC system is comprised of each of a series of chromatographic separation columns containing a liquid stationary phase and a device for dispersing the inflow of liquid mobile phase into droplets travelling through the liquid stationary phase. The liquid stationary phase has a density sufficient to retain the liquid stationary phase within the column during separation and is immiscible with the liquid mobile phase. The liquid mobile phase flows from an outlet port at a second end portion of the first of the series of chromatographic separation columns to an inlet port of a first end portion of a second of the series of chromatographic separation columns and then from an outlet port at a second end portion of the second of the series of chromatographic separation columns to an inlet port at a first end portion of an adjacent separation column of the series, and continues to flow through the series of chromatographic separation columns during separation. The method comprises introducing a liquid mobile phase through an inlet port into a first end portion of a column of the DMCC system; introducing a mixture of solutes into the first end portion of the first of the series of chromatographic separation columns, wherein each of the solutes within the mixture travels within the series of chromatographic separation columns with the flow of dispersed liquid mobile phase at a rate determined by the distribution coefficient of the solute between the liquid mobile and liquid stationary phases; eluting a solute in the liquid mobile phase from the series of chromatographic separation columns to separate the solute from the mixture of solutes; and optionally removing the slower-migrating solutes from the series of chromatographic columns after the remainder of the solutes in the mixture have been eluted to complete the chromatographic run before the slower-migrating solutes are eluted from the last of the series of chromatographic separation columns.

BRIEF DESCRIPTION OF THE SEVERAL VIEWS OF THE DRAWINGS

The following drawings form part of the present specification and are included to further demonstrate certain aspects of the present invention. The invention may be better understood by reference to one or more of these drawings in combination with the detailed description of specific embodiments presented herein.

DETAILED DESCRIPTION OF THE INVENTION

Figure 1:
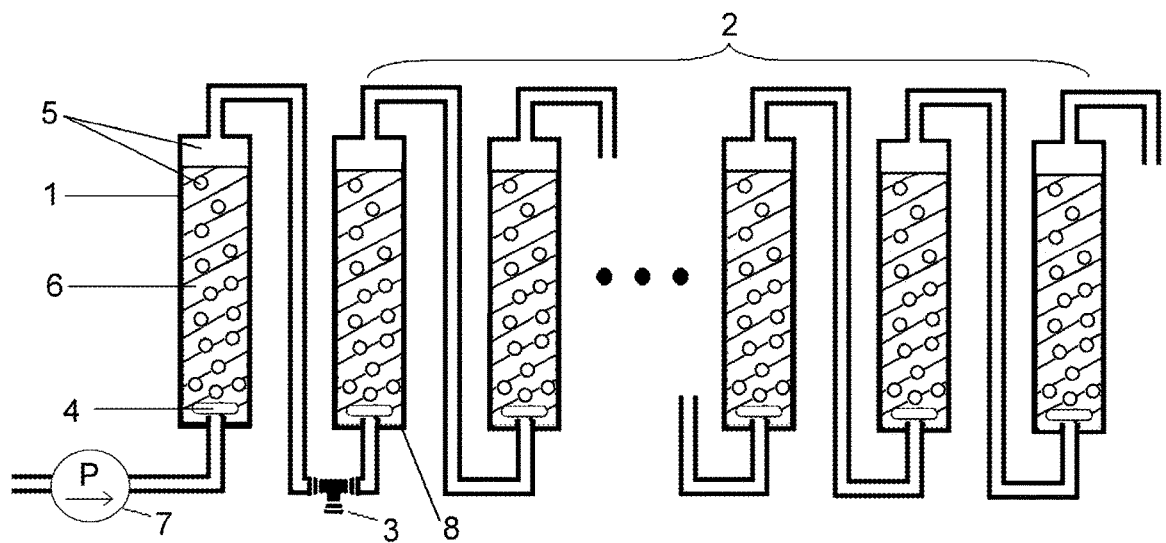
FIG. 1 shows the setup of a dispersed mobile-phase countercurrent chromatography (DMCC) system. In this instance, lighter mobile phase 5 is pumped through an equilibration column 1 by a pump 7 and a series of separation columns 2 containing the denser stationary phase 6 in an upward mode. Upon entry of the mobile phase into each of the columns, it is dispersed into mini-droplets by a magnetically driven stir bar 4. The sample mixture is infused into the first separation column 8 through an influx port 3.

Before describing the present invention in detail, it is to be understood that this invention is not limited to particular compositions of mobile phase, stationary phase or mixture of solutes employed in the examples, which may vary. It is also to be understood that the terminology used herein is for the purpose of describing particular embodiments only, and is not intended to be limiting. In addition, before describing detailed embodiments of the invention, it will be useful to set forth definitions that are used in describing the invention. The definitions set forth apply only to the terms as they are used in this patent and may not be applicable to the same terms as used elsewhere, for example in scientific literature or other patents or applications. Additionally, when examples are given, they are intended to be exemplary only and not to be restrictive.

It must be noted that, as used in this specification and the appended claims, the singular forms "a," "an" and "the" include plural referents unless the context clearly dictates otherwise.

In describing and claiming the present invention, the following terminology will be used in accordance with the definitions set out below.

The term "two immiscible liquids" as used herein refers to two liquids that cannot be mixed to form a single phase. Instead, upon termination of the mixing process, these two liquids will separate into two phases.

The term "distribution" as used herein refers to the process that results when a solute is mixed with two immiscible solvents, with the solute being partitioned, or distributed, between the immiscible upper phase solvent and lower phase solvent as described by the 'distribution coefficient' viz. $K_D$=A1/A2, where A1 represents solute concentration in the upper phase, and A2 represents solute concentration in the lower phase.

The term "stationary phase" as used herein refers to a liquid phase that has been placed within a column to serve as an immobile liquid phase, viz. stationary phase.

The term "mobile phase" as used herein refers to a liquid phase that is made to flow in a dispersed form through a column of stationary phase with which it is immiscible.

The term "countercurrent distribution" as used herein refers to the process where mini-droplets of a mobile phase travel through a column of stationary phase, and continually exchange solutes with the stationary phase such that partition of each solute between the mobile phase and the stationary phase will approach or conform to the distribution coefficient $K_D$ for the solute between the two phases.

The present DMCC invention provides a unique combination of the countercurrent distribution (CCD) principle with a continuous column chromatographic set-up for solute separations. The important advantages of CCD are two-fold: (a) the method does not require the use of any solid chromatographic matrix, and therefore avoids losses of solutes due to irreversible adsorption to solid matrix and contamination of the solutes by substances leached from the matrix; and (b) the distribution of any solute between two immiscible liquid phases is governed by, and largely predictable from, the distribution coefficient of the solute for the two liquid phases. However, the mechanical operation of the original CCD process, requiring a continual shifting of the upper and lower phases of neighboring tubes in a large battery of tubes followed by re-equilibration of the phases is cumbersome. In contrast, liquid column chromatography is widely employed on account of its convenience, but requires the usage of solid matrices. DMCC thus incorporates the two-fold advantages of CCD together with the convenient format of liquid chromatography freed of solid matrices. Because DMCC can be scaled up by increasing the number and/or volume of its column system without invoking any centrifugation, it is applicable to analytical separations, and also large scale industrial separations without incurring expensive equipment costs. Accordingly, the continuous DMCC process incorporates both the advantages of CCD and the convenience of liquid column chromatography.

The operation of DMCC is continuous in nature, employs columns with unrestricted dimensions and does not require centrifugation. Therefore the method is applicable to different scales of separations. The principle of DMCC is based on our discovery that, when a stream of liquid mobile-phase is dispersed, upon its entry into a column of liquid stationary phase that is immiscible with the mobile phase, into a suspension of fine droplets travelling through one or more serially-connected columns of stationary phase, equilibrations of various solutes between the mobile and stationary phases will be facilitated on account of the high surface/volume ratio of the droplets, thereby causing different solutes to migrate through the column(s) of stationary phase at different rates owing to their dissimilar distribution coefficients between the two phases, and hence enabling chromatographic separation of the solutes. The total volume in the DMCC column system can be made to exceed the readily attainable volume in CCD and its modifications without any requirement for centrifugation to speed up phase equilibration. The number of columns employed can also be increased practically without limit, thereby vastly enhancing the total separation capacity of the DMCC system at low equipment cost. The column system can also be built, assembled and taken apart readily using conventional chromatography columns, mobile phases, stationary phases, and associated equipment such as pumps, ultrasound, stirring devices, and piping as is well known in the art and commercially available.

In DMCC, an influx of mobile phase into a column of stationary phase can be dispersed by mechanical stirring driven by a rotating magnet or blade, or by ultrasound. The dispersed stream of mobile phase can travel through the stationary phase in the column in either the upward or downward direction. The chromatographic system can be scaled up by increasing the diameter or length of the column of stationary phase, and/or use of multiple columns connected in series.

Adding or removing columns between DMCC runs is straightforward and convenient and within the skill of one in the art. Even in the middle of a chromatographic run, columns can be switched, added or removed with only temporary stoppage of flow incurring minimal disturbance. Different fractionated solutes can be collected at different times from the effluent stream of the mobile phase exiting from the system of DMCC columns. Alternately, at the end of a run, the serially-connected columns can be drained individually so that the different solutes retained in the different stationary phases can be recovered, which usefully enables reductions of elution time and eluant volume especially in the case of solutes that migrate slowly through the columns.

To optimize solute separations, the different columns within a system of serially-connected DMCC columns can be filled with the same stationary phase or different stationary phases.

EXAMPLES

The following non-limiting examples are provided to further illustrate the present invention.

Example 1

Figure 2:
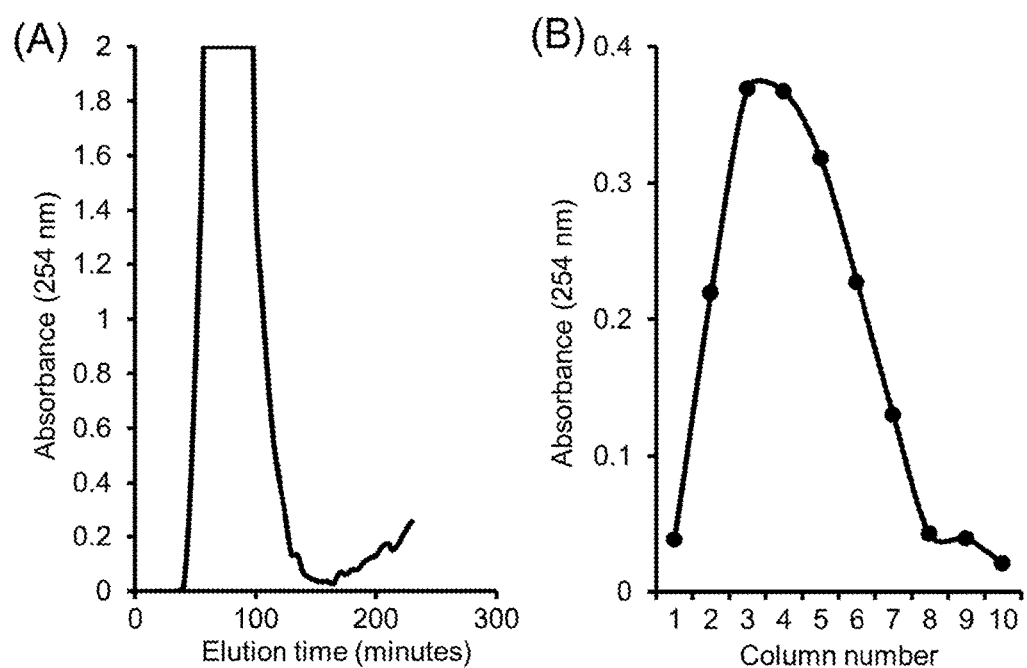
FIG. 2 shows separation of cresol and benzyl alcohol by DMCC based on partition between n-butanol (mobile phase) and 1% NaOH (stationary phase). The DMCC setup comprised one 15 mm i.d., 53 ml equilibration column and ten 25 mm i.d., 124 ml separation columns connected in series. 40 ml 1% NaOH was placed into the equilibration column and 95 ml 1% NaOH was placed into each separation column. Mobile phase consisting of n-butanol pre-equilibrated with 1% NaOH was pumped into the columns at 4 ml/min in the upward-flow mode. Magnetic stirrer was set at 300 rev/min. A mixture of 2 g cresol and 2 g benzyl alcohol was injected into the first separation column. Eluate fractions (~20 ml) were collected at 5 minute intervals. 500 µl aliquot of each fraction was mixed with 500 µl of ethanol and absorbance was determined using a Biologic LP™ at 254 nm. At the end of elution, the stationary phases in different separation columns were collected individually by drainage. A 10 µl aliquot in each instance was diluted to 1 ml for absorbance measurement at 254 nm. (A) Benzyl alcohol peak in mobile-phase eluate followed by beginning elution of cresol. (B) Cresol distribution in the stationary phases drained out from different separation columns.

Separation of cresol and benzyl alcohol by DMCC based on partition between n-butanol (mobile phase) and 1% NaOH (stationary phase). As shown in panel (A) of FIG. 2, the benzyl alcohol peak was eluted from the column system at about 120 minutes, followed by elution of cresol. Since cresol was moving slowly through the columns, the run was terminated after about 240 minutes. Upon termination of the run, the stationary phases in the different columns were drained and analyzed. Cresol peak was located over columns 1-8 (panel (B) of FIG. 2). This example illustrates the convenience and economy of recovering a slowly moving solute through column drainage prior to its elution from the columns, thereby reducing the consumption of time and mobile-phase solvent.

Example 2

Figure 3:
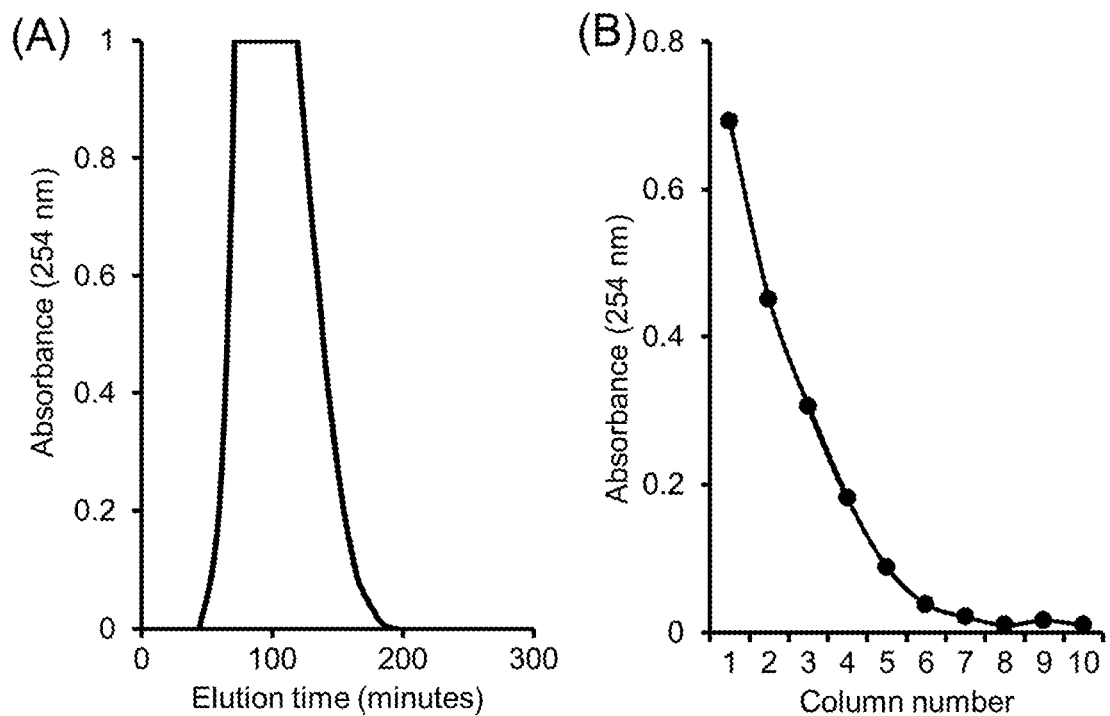
FIG. 3 shows separation of cresol and benzyl alcohol by DMCC based on 1% NaOH (mobile phase) and chloroform (stationary phase). The DMCC setup was same as FIG. 2. 40 ml chloroform was placed into the equilibration column and 95 ml chloroform was placed into each separation column. Mobile phase consisting of 1% NaOH pre-equilibrated with chloroform was pumped into the columns at 4 ml/min in upward-flow mode. A mixture of 2 g cresol and 2 g benzyl alcohol was injected into the first separation column. Eluate fractions (~20 ml) were collected at 5 minute intervals. 20 µl aliquot of each collected fraction was mixed with 980 µl of milli-Q water and absorbance was determined at 254 nm. At the end of elution, the stationary phases in different separation columns were collected individually by drainage. A 50 µl aliquot in each instance was diluted to 1 ml with ethanol for absorbance measurement at 254 nm. The cresol was eluted from the columns between 45-160 minutes (FIG. 3A), whereas benzyl alcohol was recovered from column drainage over columns 1-8 (FIG. 3B).

Separation of cresol and benzyl alcohol by DMCC was conducted based on partition between 1% NaOH (mobile phase) and chloroform (stationary phase). In Example 1, the organic phase served as mobile phase, and the aqueous phase served as stationary phase. This was reversed in Example 2 (FIG. 3), illustrating the practicality of both of these modes of DMCC operation. The cresol was eluted from the columns between 45-160 minutes (panel (A) of FIG. 3), whereas benzyl alcohol was recovered from column drainage over columns 1-8 (panel B of FIG. 3).

Example 3

Figure 4:
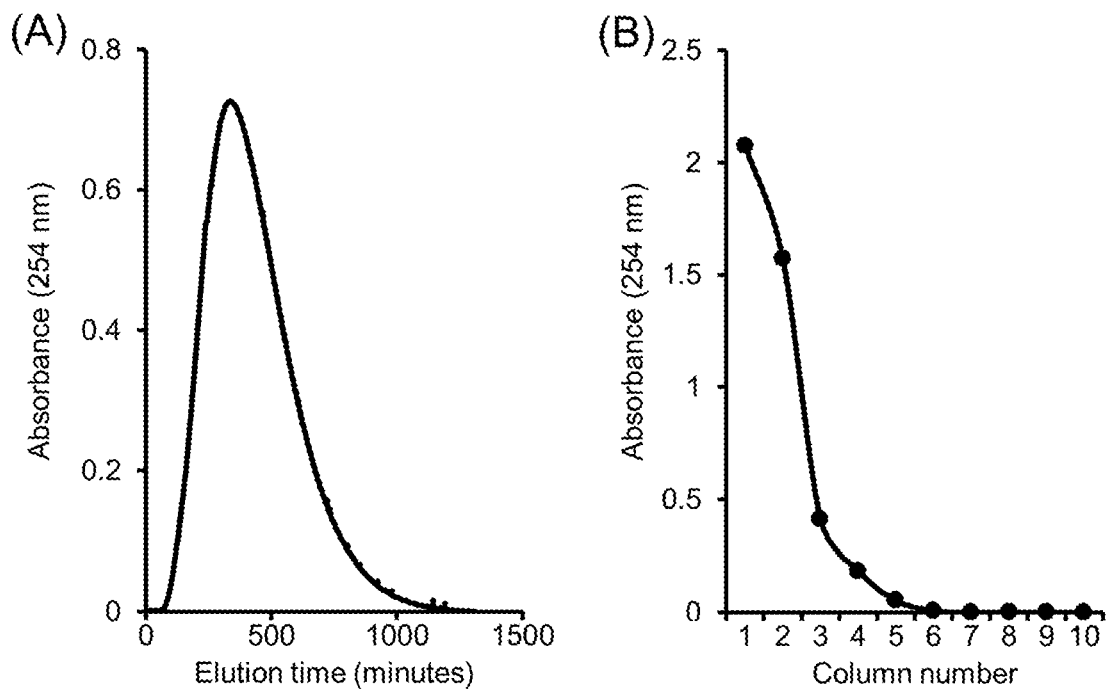
FIG. 4 shows separation of phenol and nitrobenzene by DMCC. The DMCC setup was same as FIG. 2. 40 ml chloroform was placed into the equilibration column and 95 ml chloroform was placed into each separation column. Mobile phase consisting of milli-Q water pre-equilibrated with chloroform was pumped into the columns at 4 ml/min in upward-flow mode. A mixture of 3 g phenol and 3.6 g nitrobenzene was injected into the first separation column. The absorbance of eluate was measured at 254 nm. At the end of elution, the stationary phases in different separation columns were collected individually by drainage. A 50 µl aliquot in each instance was diluted to 1 ml with ethanol for absorbance measurement at 254 nm. (A) Elution of phenol in mobile-phase. (B) Nitrobenzene in drainage from different stationary phases after termination of run.

Separation of phenol and nitrobenzene by DMCC was conducted. In this example, phenol was eluted from the columns in the mobile phase (panel A of FIG. 4), whereas nitrobenzene was recovered from column drainage after termination of the run (panel B of FIG. 4).

Example 4

Figure 5:
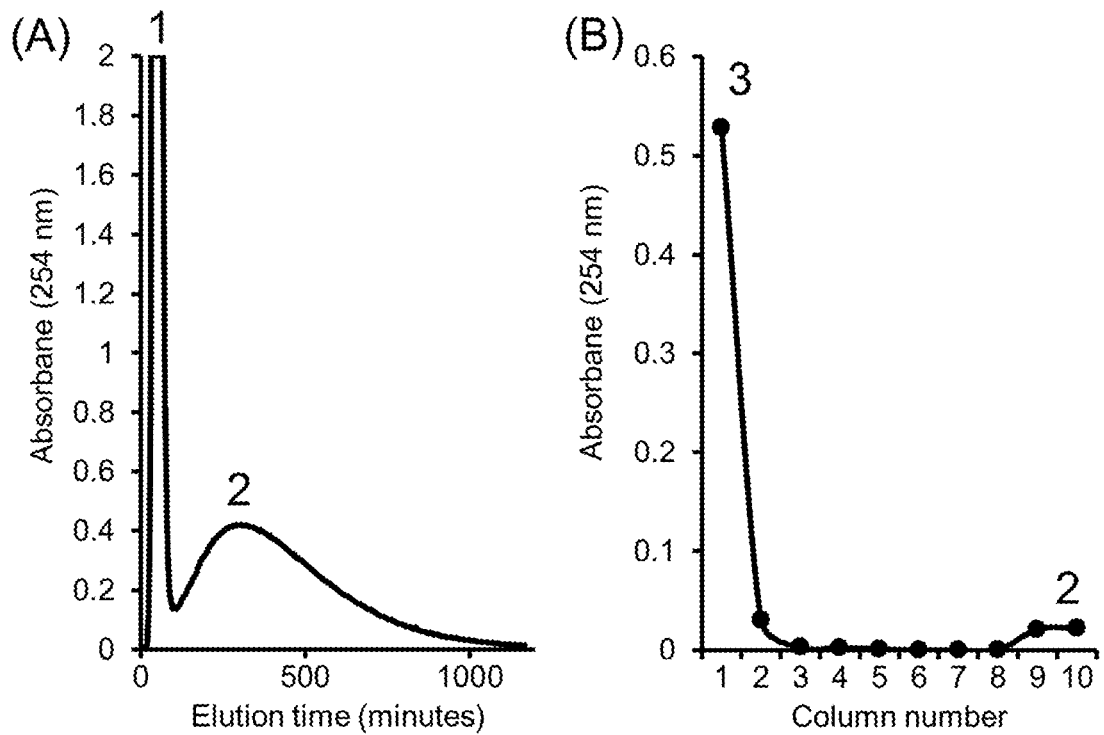
FIG. 5 shows separation of sodium benzoate, phenol and toluene by DMCC. The DMCC setup was same as FIG. 2. 40 ml chloroform was placed into the equilibration column and 95 ml chloroform was placed into each separation column. Mobile phase consisting of milli-Q water pre-equilibrated with chloroform was pumped into the columns at 4 ml/min in upward-flow mode. A mixture of 3.3 g sodium benzoate, 3 g phenol and 2.7 g toluene was injected into the first separation column. The absorbance of eluate was measured at 254 nm. At the end of elution, the stationary phases in different separation columns were collected individually by drainage. A 50 µl aliquot in each instance was diluted to 1 ml with ethanol for absorbance measurement at 254 nm. (A) Elution of sodium benzoate (peak 1) and phenol (peak 2) in mobile phase. (B) Toluene (peak 3) and residual phenol (peak 2) from drainage of different columns.

Separation of sodium benzoate, phenol and toluene by DMCC was shown. This example illustrated the separation of three solutes, namely sodium benzoate (peak 1) and phenol (peak 2) in the eluate (panel A of FIG. 5), and toluene (peak 3) in the column drainage (panel B of FIG. 5).

Example 5

Figure 6:
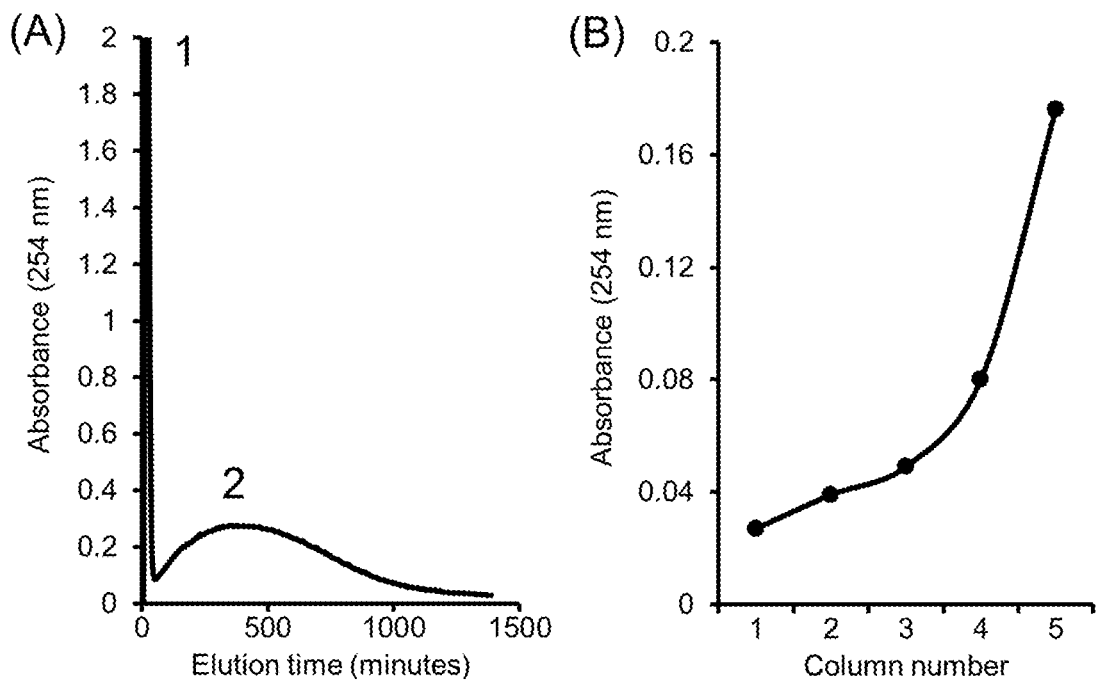
FIG. 6 shows separation of uracil and benzyl alcohol by DMCC. The DMCC setup was same as FIG. 2. 40 ml chloroform was placed into the equilibration column and 95 ml chloroform was placed into each separation column. Mobile phase consisting of milli-Q water pre-equilibrated with chloroform was pumped into the columns at 4 ml/min in upward-flow mode. A mixture of 150 mg uracil and 3 g benzyl alcohol was injected to the first separation column. The absorbance of eluate was measured at 254 nm. At the end of elution, the stationary phases in different separation columns were collected individually by drainage. A 50 µl aliquot in each instance was diluted to 1 ml with ethanol for absorbance measurement at 254 nm. (A) Elution of uracil (peak 1) followed by benzyl alcohol (peak 2) in mobile phase. (B) Residual benzyl alcohol from drainage of different columns.

Separation of uracil and benzyl alcohol by DMCC was shown. Uracil (peak 1) was eluted rapidly from the columns followed by benzyl alcohol (peak 2) (panel A of FIG. 6). Tailings of benzyl alcohol in the stationary phases were demonstrated by column drainage (panel B of FIG. 6).

Example 6

Figure 7:
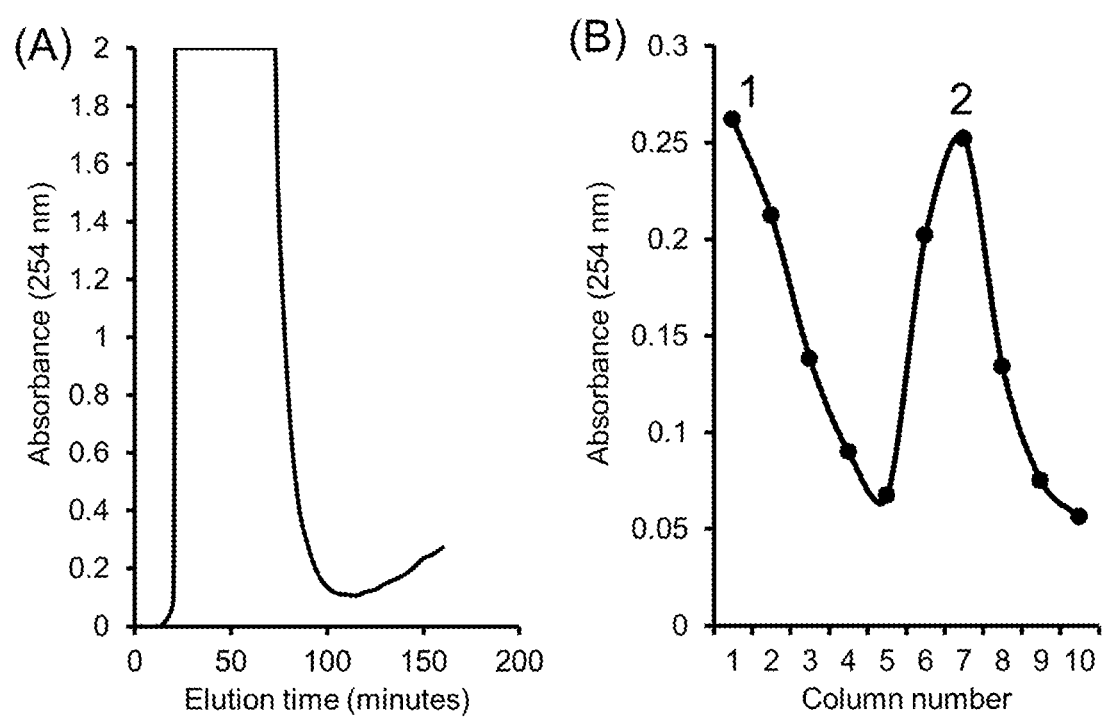
FIG. 7 shows separation of benzoic acid, phenol and benzyl alcohol by DMCC. The DMCC setup was same as FIG. 2. 40 ml milli-Q water was placed into the equilibration column, 95 ml 0.1M $NaHCO_3$ in columns 1 to 5, and 95 ml 0.1M NaOH in columns 6 to 10. Mobile phase consisting of n-butanol pre-equilibrated with 1% NaOH was pumped into the columns at 4 ml/min in upward-flow mode. A mixture of 1 g benzoic acid, 1 g phenol and 3 g benzyl alcohol was injected into the first separation column. Eluate fractions (~20 ml) were collected at 5 minute intervals. 500 µl aliquot of each collected fraction was mixed with 500 µl of ethanol and absorbance was determined at 254 nm. At the end of elution, the stationary phases in different separation columns were collected individually by drainage. A 10 µl aliquot in each instance was diluted to 1 ml with milli-Q water for absorbance measurement at 254 nm. (A) Benzyl alcohol peak in mobile-phase eluate. (B) Benzoic acid (peak 1) and phenol (peak 2) distributions in drainage from stationary phases in different columns.

Separation of benzoic acid, phenol and benzyl alcohol by DMCC. Benzyl alcohol was eluted in the mobile-phase eluate followed with beginning elution of phenol (panel A of FIG. 7). Benzoic acid (peak 1) was recovered from drainage of columns 1-4, and phenol (peak 2) recovered from drainage of columns 6-10 (panel B of FIG. 7). In this example, separation between benzoic acid and phenol was facilitated by placement of different stationary phases in different columns, viz. 0.1M $NaHCO_3$ in columns 1-5, and 0.1M NaOH in columns 6-10, thereby illustrating the advantage of using different stationary phases in different columns.

The ability of the Dispersed Mobile-Phase Countercurrent Chromatography (DMCC) method to bring about separation of different solutes based on the different distribution coefficients of different solutes under the operating format of liquid column chromatography was demonstrated in Examples 1-6. These examples showed that DMCC can employ an organic phase as mobile phase and an aqueous phase as stationary phase as in Examples 1 and 6, or an aqueous phase as mobile phase and an organic phase as stationary phase as in Examples 2-5. It can also employ a single stationary phase in the different separation columns as in Examples 1-5, or more than one stationary phases in the different columns as in Example 6. Different solutes can be collected from the mobile-phase eluate emerging from the column system, and also from drainage from the stationary phases in different columns as in Examples 1-4 and 6. Moreover, chromatographic resolution of DMCC can be enhanced through the reduction of mobile-phase dead volume in the columns or the use of extra columns, bringing about the separation of such structurally similar solutes as baicalein and wogonin [12]. In view of this, DMCC is well suited to a variety of purification problems, e.g. separation of chemical ingredients in medicinal herbs or organic synthetic product mixtures. On account of its avoidance of adsorptive losses of solutes and contamination by solid-matrix materials in the course of separation, DMCC can be applied to the purification of even chemical constituents that are present in relatively low quantities in a mixture. Furthermore, because DMCC does not call for any volume restriction in its operation, and does not require expensive equipment such as centrifugal devices, it can be scaled up readily for large scale industrial separations at relatively modest cost.

The following references have been cited in the foregoing paragraphs:

[1] L. Craig, "Identification of small amounts of organic compounds by distribution studies: II. Separation by counter-current distribution," *Journal of Biological Chemistry*, vol. 155, pp. 535-546, 1944.
[2] T. Tanimura, J. J. Pisano, Y. Ito, and R. L. Bowman, "Droplet countercurrent chromatography," *Science*, vol. 169, pp. 54-56, 1970.
[3] T. Tanimura and Y. Ito, "Droplet countercurrent chromatography," U.S. Pat. No. 3,853,765, Dec. 10, 1974.
[4] W. Murayama, T. Kobayashi, Y. Kosuge, H. Yano, Y. Nunogaki, and K. Nunogaki, "A new centrifugal countercurrent chromatograph and its application," *Journal of Chromatography A*, vol. 239, pp. 643-649, 1982.
[5] Y. Nunogaki, "Centrifugal counter-current distribution chromatography" U.S. Pat. No. 4,968,428, Nov. 6, 1990.
[6] Y. Ito, "Preparative countercurrent chromatography with a slowly rotating helical tube array," U.S. Pat. No. 4,051,025, Sep. 27, 1977.
[7] Y. Ito, J. Sandlin, and W. G Bowers, "High-speed preparative counter-current chromatography with a coil planet centrifuge," *Journal of Chromatography A*, vol. 244, pp. 247-258, 1982.
[8] Y. Ito, "High speed preparative countercurrent chromatography with a multiple layer coiled column" U.S. Pat. No. 4,430,216, Feb. 7, 1984.
[9] H. Qu, "High-speed countercurrent chromatograph," People's Republic of China Patent ZL201520306978.0, Nov. 25, 2015.
[10] H. Guzlek, P. L. Wood, and L. Janaway, "Performance comparison using the GUESS mixture to evaluate counter-current chromatography instruments," *Journal of Chromatography A*, vol. 1216, pp. 4181-4186, 2009.
[11] A. E. Kostanyan, A. A. Voshkin, and N. V. Kodin, "Controlled-cycle pulsed liquid-liquid chromatography. A modified version of Craig's counter-current distribution," *Journal of Chromatography A*, vol. 1218, pp. 6135-6143, 2011.
[12] T. Ho and H. Xue, "Dispersed Mobile-Phase Countercurrent Chromatography," *Separations*, vol. 3, p. 32, 2016.

What is claimed is:

1. A method of separating a mixture of solutes using a dispersed-mobile phase countercurrent chromatography (DMCC) system, the method comprising:
introducing a liquid mobile phase through an inlet port into a first end portion of a column of a DMCC system, the DMCC system comprised of:
each of a series of chromatographic separation columns containing a liquid stationary phase and a device for dispersing the inflow of liquid mobile phase into droplets travelling through the liquid stationary phase, the device comprising a rotor- or magnet-driven device or an ultrasound device close to the inlet port through which the liquid mobile phase enters the column of liquid stationary phase, the liquid stationary phase having a density sufficient to retain the liquid stationary phase within the column during separation and being immiscible with the liquid mobile phase, and
the liquid mobile phase flowing from an outlet port at a second end portion of the first of the series of chromatographic separation columns to an inlet port of a first end portion of a second of the series of chromatographic separation columns and then from an outlet port at a second end portion of the second of the series of chromatographic separation columns to an inlet port at a first end portion of an adjacent separation column of the series, and continuing to flow through the series of chromatographic separation columns during separation;
introducing a mixture of solutes into the first end portion of the first of the series of chromatographic separation columns, wherein each of the solutes within the mixture travels within the series of chromatographic separation columns with the flow of dispersed liquid mobile phase at a rate determined by the distribution coefficient of the solute between the liquid mobile and liquid stationary phases;
eluting a solute in the liquid mobile phase from the series of chromatographic separation columns to separate the solute from the mixture of solutes; and
optionally removing the slower-migrating solutes from the series of chromatographic columns after the remainder of the solutes in the mixture have been eluted to complete the chromatographic run before the slower-migrating solutes are eluted from the last of the series of chromatographic separation columns, wherein each of the series of chromatographic separation columns is not segmented into a cascade of chambers.

2. The method of claim 1, where the mobile phase is enriched in organic solvent(s), and the stationary phase is enriched in aqueous solvent(s).

3. The method of claim 1, where the mobile phase is enriched in aqueous solvent(s), and the stationary phase is enriched in organic solvent(s).

4. The method of claim 1, where different separated solutes are collected from the liquid mobile phase eluate exiting the series of chromatographic separation columns in accordance to their respective times of emergence in the eluate from the columns.

5. The method of claim 1, where different separated solutes are collected from drainage of the liquid stationary phase from one or more of the series of chromatographic separation columns in accordance to the varied locations of different solutes on different columns at the end of a chromatographic run.

6. The method of claim 1, further comprising dispersing the liquid mobile phase into droplets having an average diameter smaller than 30% of the internal diameter of the column of stationary phase through which it travels in order to provide a surface/volume ratio of the droplets sufficient for achieving a desired rate of equilibration of solutes between the dispersed liquid mobile phase and the liquid stationary phase.

7. The method of claim 1, wherein the droplets of the liquid mobile phase travel upward through each of the columns, such that the first end portions are bottom portions, and the second end portions are top portions.

8. The method of claim 1, wherein the droplets of the liquid mobile phase travel downward through each of the columns, such that the first end portions are top portions, and the second end portions are bottom portions.

9. The method of claim 1, wherein the DMCC system further comprises an equilibration column connected in series with the series of chromatographic separation columns,
the equilibration column containing a liquid stationary phase and a device for dispersing the inflow of liquid mobile phase into droplets travelling through the liquid stationary phase, the liquid stationary phase having a density sufficient to retain the liquid stationary phase within the column during separation and being immiscible with the liquid mobile phase, and the liquid mobile phase flowing from an outlet at a second end portion of the equilibration column to an inlet of a first end portion of a first of the series of chromatographic separation columns and continuing to flow through the series of chromatographic separation columns during separation; and the liquid mobile phase is passed through the equilibration column, wherein it is equilibrated with the liquid stationary phase, before its entry into the first of the series of chromatographic separation columns.

10. The method of claim 1, wherein the mixture of solutes to be separated is introduced into the first of the series of chromatographic separation columns dissolved in a pulse of liquid mobile phase.

11. The method of claim 1, wherein the mixture of solutes to be separated is introduced into the first of the series of chromatographic separation columns dissolved in a pulse of liquid stationary phase.

12. The method of claim 1, wherein the liquid mobile phase is introduced into the DMCC columns by pumping.

13. The method of claim 1, wherein the mixture of solutes is introduced into the DMCC columns by pumping.

* * * * *